United States Patent [19]
Bohm

[11] Patent Number: 5,880,357
[45] Date of Patent: Mar. 9, 1999

[54] LEAK DETECTOR WITH VACUUM PUMPS AND OPERATING PROCESS FOR SAME

[75] Inventor: Thomas Bohm, Cologne, Germany

[73] Assignee: Leybold Aktiengesellschaft, Germany

[21] Appl. No.: 836,921

[22] PCT Filed: Oct. 7, 1995

[86] PCT No.: PCT/EP95/03960

§ 371 Date: May 12, 1997

§ 102(e) Date: May 12, 1997

[87] PCT Pub. No.: WO96/17237

PCT Pub. Date: Jun. 6, 1996

[30] Foreign Application Priority Data

Nov. 26, 1994 [DE] Germany ............ 44 42 174.5

[51] Int. Cl.[6] ............................................. G01M 3/20
[52] U.S. Cl. ............................................. 73/40.7
[58] Field of Search ................................... 73/40.7

[56] References Cited

U.S. PATENT DOCUMENTS

| | | | |
|---|---|---|---|
| 4,779,449 | 10/1988 | Bley et al. ................. | 73/40.7 |
| 4,893,497 | 1/1990 | Danielson ................. | 73/40.7 |
| 5,107,697 | 4/1992 | Tallon et al. .............. | 73/40.7 |
| 5,297,422 | 3/1994 | Baret ....................... | 73/40.7 |
| 5,341,671 | 8/1994 | Baret et al. ............... | 73/40.7 |

FOREIGN PATENT DOCUMENTS

| | | |
|---|---|---|
| A283543 | 9/1988 | European Pat. Off. . |
| 4136950 | 10/1992 | European Pat. Off. . |
| 3710782 | 10/1988 | Germany . |
| 4320963 | 10/1994 | Germany . |
| 2025530 | 1/1980 | United Kingdom . |

OTHER PUBLICATIONS

*Theory and Practice of Vacuum Technology*, Friedr. Vieweg & Sohn, pp. 449–457, 1989.

*Trockenlaufende Vakuumpumpen*, Robert Lamprecht, pp. 255–259, 1993.

*Primary Examiner*—Michael Brock
*Attorney, Agent, or Firm*—Wall Marjama Bilinski & Burr

[57] ABSTRACT

A leak detection device includes a high vacuum pump implemented as a friction vacuum pump with two further vacuum pumps operating against atmospheric pressure. The further vacuum pumps are dry-sealing pumps in order to avoid hydrocarbon contaminations in a region of a test sample or a test chamber.

9 Claims, 1 Drawing Sheet

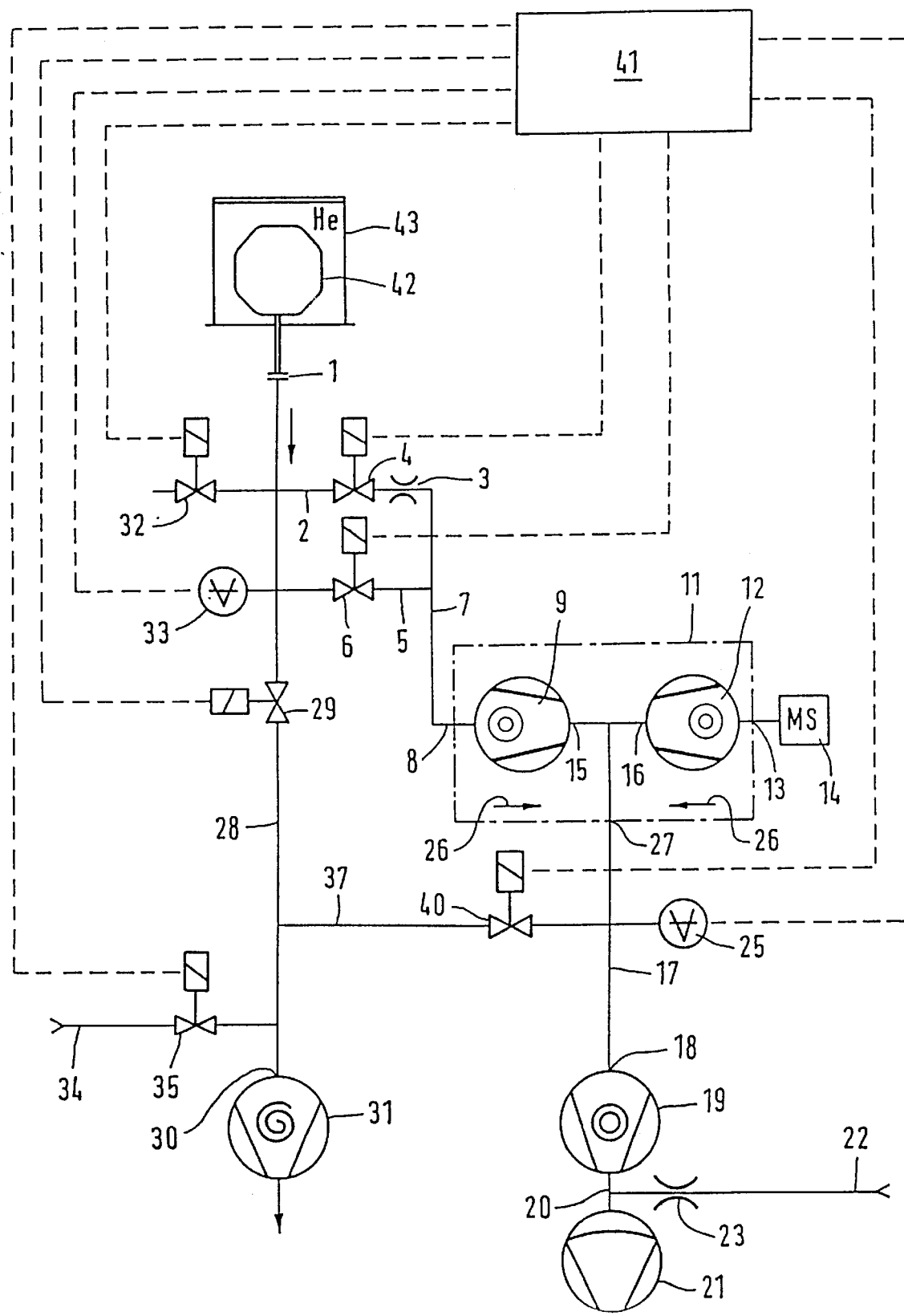

LEAK DETECTOR WITH VACUUM PUMPS AND OPERATING PROCESS FOR SAME

BACKGROUND OF THE INVENTION

The invention relates to a leak detection device with a high-vacuum pump implemented as a friction vacuum pump and two further vacuum pumps working against atmospheric pressure. The invention, furthermore, relates to a process for operating such leak detection device.

A leak detector of this type is disclosed in EU-A-283543. It operates according to the principle of counterflow (with helium as the test gas) and permits the detection of the impermeability of a test sample, respectively its permeability, and specifically gross impermeability to extremely small leaks (leakage rates up to $10^{-10}$ mbars l/s). In the helium leak detection with a device of the prior known type, the danger exists of hydrocarbon contamination occurring in the region of the test sample and/or the test chamber. These are caused by molecules which originate in the suction chambers of the oil-sealed vacuum pumps operating against atmospheric pressure and which diffuse back into the high-vacuum region against the delivery direction of the vacuum pump.

SUMMARY OF THE INVENTION

The invention addresses the problem of avoiding hydrocarbon contaminations in the region of the test sample and/or of the test chamber.

This problem is solved according to the invention thereby that both further vacuum pumps are dry-sealing vacuum pumps. Dry-sealing vacuum pumps are those which operate without sealing oil in its suction chamber. Among the pumps of this type are diaphragm vacuum pumps or vacuum pumps (spiral pumps) operating according to the principle of the spiral such as are known for example from DE-A-28 31 179.

Preferably a flushing gas line terminates in the inlet region of one or both dry-sealing vacuum pumps, via which, during or between the measuring times, flushing gas (for example air) can be supplied. Thereby, in spite of using dry-sealing vacuum pumps, the response time of the leak detector can be kept short and its detection sensitivity high. Without a flushing gas inlet, the replacement of oil-sealing vacuum pumps working against atmospheric pressure would cause an extension of the response time and an impairment of the detection sensitivity of the leak detector. Dry-sealing forevacuum pumps of the cited type have the characteristic that their suction capability in the proximity of their relatively high terminal pressure have a suction capability which approximates zero. Therefore the response time is extended. In addition, this characteristic leads to the fact that a helium background stemming from the leakages impairs the detection sensitivity.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 shows a schematic of a leak detection device according to an embodiment of the present invention.

DETAILED DESCRIPTION OF THE PREFERRED EMBODIMENT

Referring to FIG. 1, a leak detection device 100 includes an inlet 1 connected through lines 2 (with choke 3 and valve 4) and 5 (with valve 6) guided in parallel as well as a line 7 with the entrance side connection 8 of a high-vacuum pump stage 9.

The high-vacuum pump stage 9 is a stage of a friction vacuum pump, preferably a two-stage turbomolecular pump 11, whose second stage is denoted by 12. At the entrance side connection 13 of the second stage 12 is connected a test gas detector, preferably a mass spectrometer 14. The two exit sides 15 and 16 of the high-vacuum pump stages 9 and 12 are connected in common via the line 17 with the entrance side connection 18 of a friction pump 19, preferably a turbomolecular pump. At the pressure side a diaphragm pump 21 is connected via the connection line 20 to the turbomolecular pump 19. Diaphragm pump 21 operates against atmospheric pressure. In line 20 terminates a flushing gas feed line 22 with a choke 23. To the line 17 is additionally connected the pressure measuring site 25.

The two turbomolecular pump stages 9 and 12 are disposed on a common shaft (not shown). Connections 8 and 13 are located in the region of the external front faces of the turbomolecular pump 11. During operation the flow passes through the two pump stages 9 and 12 from the outside toward the inside (arrow 26) so that only a forevacuum connection 27 is present.

In addition, the inlet 1 of the leak detection device 100 is connected via the line 28 with a valve 29 to the entrance side connection 30 of a second vacuum pump 31. This pump 31 is a vacuum pump operating according to the principle of the spiral. A ventilation valve 32 and a pressure measuring site 33 are connected to line. Between the valve 29 and entrance side connection 30 of the vacuum pump 31. The line 28 is also connected to a flushing gas feed line 34 with a valve 35.

The entrance side connections 18 and 30 of the two vacuum pumps 19 and 31 are connected with each other via a line 37 which is equipped with a control valve 40.

For automation of the process of leakage detection a central control 41 is provided which, via control lines, not specifically provided with reference symbols, are also connected with the control valves as well as the pressure measuring sites.

In carrying out the leak detection with the depicted leak detection device, the procedure is as follows: first, with valves 4, 6, 29, 35, 40 closed, the leak detection device is brought into its operation-ready state by switching on the vacuum pumps 19, 21 as well as 31 and subsequently the turbomolecular pump 11. The device is ready to operate when the pressure in the mass spectrometer 14 is lower than $10^{-4}$ mbars, when the number of rotations of the turbomolecular pump 11 has reached its nominal value, and when the forevacuum pressure (measuring device 25) is lower than the maximum allowed pressure (for example 0.1 mbar).

A test sample 42, disposed in a test chamber 43, is connected to the inlet 1 of the leak detection device 100. In the test chamber 43 is disposed test gas, preferably helium, which, during the leak detection, penetrates into the test sample if the latter has a leak. The test chamber 43 can be omitted if the test sample 42 is sprayed with helium. In an alternative embodiment, the test sample 42 itself is filled with helium. In this case the chamber 43 is connected to inlet 1.

To initiate the leak detection, the ventilation valve 32, which is potentially still open, is closed and the valve 29 in line 28 is opened. The connection of the test sample 42 with the vacuum pump 31 is established so that the test sample is evacuated.

If the test sample does not have a gross leak, the pressure in the interior of the test sample, registered by the pressure measuring site 33, will decrease relatively fast. When it reaches a value of approximately 100 mbars, valve 4 is opened so that the high-vacuum pump stage 9 via the choke 3 is connected with line 28, with inlet 1, and thus with the test sample 42. If, during the further evacuation to approximately a pressure of 0.1 mbar, helium penetrates into the test sample 42, then this helium arrives via choke 3 and the two high-vacuum pump stages 9 and 12 at the mass spectrometer 14. The leak detection can in this case be terminated. Leaks having leakage rates of the order of magnitude of approximately 10 to $10^{-5}$ mbars l/s can be detected during this leak detection phase.

If during this phase helium is not registered by the mass spectrometer 14, a further leak detection starts with yet higher sensitivity such that the connection to the high-vacuum pump stage 9 is enabled unchoked. For this purpose, at a pressure of approximately 0.1 mbar in the test sample 42 valve 29 is closed and valves 6 and 40 are opened. Evacuation of the test sample takes place via the high-vacuum pump stage 9 and all pumps 19, 21 and 31. Helium which was potentially also transported arrives through the turbomolecular pump stage 12 at the mass spectrometer 14. Leaks having leakage rates of approximately $10^{-3}$ to $10^{-10}$ mbars l/s can be detected in this leak detection phase.

If the test sample is still impermeable its inner pressure will decrease further. If the pressure drops to approximately $2.10^{-2}$ mbars (measuring device 33), an even more sensitive leak detection phase can be started by ensuring that valve 40 is closed. As a result the suction capability of the forevacuum pump system decreases strongly so that the leak detection becomes correspondingly more sensitive. If helium is also not registered by the mass spectrometer 14 in this phase, the test sample 42 can be considered to be impermeable.

The vacuum pump 21 is a diaphragm pump. In order to be able to generate the requisite forevacuum pressure for the turbomolecular pump 11, vacuum pump 21 is preceded by a turbomolecular pump 19. The suction capability of the turbomolecular pump is choked such that a high detection sensitivity can be attained. In order to solve the problem of the helium background and the poor response time, a gas stream is continuously introduced via the choke 23 into the intermediate line 20. This entrains the helium atoms reaching the intermediate line 20 so that an undesirable helium background cannot build up.

In order to eliminate the helium background in the spiral pump 31, a relatively large quantity of gas must be pumped. Therefore, with the valve 35 open the pressure increases such that a measuring operation is not simultaneously possible. The valve 35 is therefore only automatically opened if at least valves 29, 40 or all valves, with the exception of valve 35, are closed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A leak detection device comprising:

a high vacuum pump implemented as a friction vacuum pump;

two dry-sealing vacuum pumps operating against atmospheric pressure; and a turbomolecular pump disposed between said friction vacuum pump and a first of said dry-sealing vacuum pumps, wherein the first of said dry-sealing pumps and said turbomolecular pump is connected to a forevacuum connection of the friction vacuum pump, and in which a suction capability of the turbomolecular pump is choked in order to improve a detection sensitivity of the leak detection device.

2. Leak detection device as stated in claim 1, wherein one of the dry-sealing vacuum pumps is a spiral pump and the other of said dry-sealing vacuum pumps is a diaphragm pump.

3. Leak detection device as stated in claim 1, wherein the first of the two dry-sealing pumps is implemented as a diaphragm pump.

4. Leak detection device as stated in claim 1, wherein a flushing gas feed line terminates in a region of an inlet of the first of said dry-sealing vacuum pumps.

5. Leak detection device as stated in claim 4, wherein a choke is disposed in the flushing gas feed line.

6. Leak detection device as stated in claim 5, including means for continuously introducing a gas stream through the choke via the flushing gas feed line.

7. Leak detection device as stated in claim 1, wherein a second of the two dry-sealing vacuum pumps is directly connected to an inlet of the leak detection device through a line via an inlet valve, said pump being implemented as a spiral pump.

8. Leak detection device as stated in claim 7, wherein a flushing gas feed line terminates in a region of an inlet of the spiral pump.

9. Leak detection device as stated in claim 7, wherein the first of said dry-sealing vacuum pumps is a diaphragm pump, said device including:

a flushing gas feed line connected to the spiral pump via a first connecting valve;

the spiral pump and the diaphragm pump being connected through a line having a control valve therein; and means for introducing a flushing gas through said first connecting valve only when at least said inlet valve and said control valve are closed.

* * * * *